(12) United States Patent
Abraham et al.

(10) Patent No.: US 10,863,431 B2
(45) Date of Patent: Dec. 8, 2020

(54) SYSTEMS AND METHODS FOR SYNCHRONIZATION WITHIN A NEIGHBORHOOD AWARE NETWORK

(71) Applicant: QUALCOMM Incorporated, San Diego, CA (US)

(72) Inventors: Santosh Paul Abraham, San Diego, CA (US); Alireza Raissinia, Monte Sereno, CA (US); George Cherian, San Diego, CA (US); Abhishek Pramod Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 577 days.

(21) Appl. No.: 14/931,752

(22) Filed: Nov. 3, 2015

(65) Prior Publication Data
US 2016/0135122 A1 May 12, 2016

Related U.S. Application Data

(60) Provisional application No. 62/076,033, filed on Nov. 6, 2014.

(51) Int. Cl.
*H04W 52/02* (2009.01)
*H04W 56/00* (2009.01)
(Continued)

(52) U.S. Cl.
CPC ....... *H04W 52/02* (2013.01); *H04W 52/0216* (2013.01); *H04W 52/0229* (2013.01);
(Continued)

(58) Field of Classification Search
CPC ............. H04W 52/02; H04W 52/0216; H04W 52/0229; H04W 56/00; H04W 56/0015;
(Continued)

(56) References Cited

U.S. PATENT DOCUMENTS

| 5,297,162 A | * | 3/1994 | Lee ...................... H04B 1/7097 370/342 |
| 6,252,445 B1 | * | 6/2001 | Eidson ................... G04F 1/005 327/172 |

(Continued)

FOREIGN PATENT DOCUMENTS

| CN | 101601229 A | 12/2009 |
| CN | 103918324 A | 7/2014 |

(Continued)

OTHER PUBLICATIONS

International Search Report and Written Opinion—PCT/US2015/059019—ISA/EPO—dated Mar. 2, 2016.

*Primary Examiner* — Maharishi V Khirodhar
*Assistant Examiner* — Natali Pascual Peguero
(74) *Attorney, Agent, or Firm* — Steven R. Thiel

(57) ABSTRACT

Methods, devices, and computer program products for synchronization of wireless devices in a peer-to-peer network are described herein. In one aspect, a method of wireless communication apparatus is provided. The method includes receiving, at an apparatus, at least one of: an offset parameter indicating an offset, with respect to a default time period, during which the apparatus should be in an active mode for transmitting and/or receiving data, and an interval parameter indicating a multiple of time periods, wherein the apparatus should be in the active mode for transmitting and/or receiving data during each time period. The method further includes determining at least one wakeup time period to be in the active mode based on the offset parameter or the interval parameter. The method further includes transmitting and/or receiving data during the at least one wakeup time period.

20 Claims, 8 Drawing Sheets

(51) Int. Cl.
*H04W 72/04* (2009.01)
*H04W 48/12* (2009.01)
*H04W 84/12* (2009.01)

(52) U.S. Cl.
CPC ....... *H04W 56/00* (2013.01); *H04W 56/0015* (2013.01); *H04W 72/0446* (2013.01); *H04W 48/12* (2013.01); *H04W 84/12* (2013.01); *Y02D 70/00* (2018.01); *Y02D 70/142* (2018.01); *Y02D 70/164* (2018.01); *Y02D 70/22* (2018.01)

(58) Field of Classification Search
CPC . H04W 72/0446; H04W 48/12; H04W 84/12; Y02D 70/00; Y02D 70/142; Y02D 70/164; Y02D 70/22
USPC .................................................. 370/311, 342
See application file for complete search history.

(56) References Cited

U.S. PATENT DOCUMENTS

| | | |
|---|---|---|
| 8,326,372 B2 | 12/2012 | Raissinia |
| 9,544,754 B1* | 1/2017 | Lambert ............... H04W 8/005 |
| 2003/0009605 A1* | 1/2003 | Duruoz ................. H04N 7/163 |
| | | 719/328 |
| 2009/0182871 A1 | 7/2009 | Gupta et al. |
| 2011/0142014 A1* | 6/2011 | Banerjee ............. H04L 63/0869 |
| | | 370/338 |
| 2013/0044658 A1* | 2/2013 | Zhu ................... H04W 52/0229 |
| | | 370/311 |
| 2013/0235773 A1 | 9/2013 | Wang et al. |
| 2014/0254426 A1 | 9/2014 | Abraham et al. |
| 2014/0293851 A1* | 10/2014 | Abraham .......... H04W 52/0225 |
| | | 370/311 |
| 2015/0200811 A1* | 7/2015 | Kasslin .................. H04L 41/12 |
| | | 370/254 |
| 2015/0358800 A1* | 12/2015 | Park ...................... H04W 8/005 |
| | | 370/311 |

FOREIGN PATENT DOCUMENTS

| | | |
|---|---|---|
| CN | 104053227 A | 9/2014 |
| WO | WO-2009062116 A1 | 5/2009 |
| WO | WO-2009091740 A2 | 7/2009 |
| WO | WO-2014138229 A1 | 9/2014 |
| WO | WO-2014160543 A1 | 10/2014 |

* cited by examiner

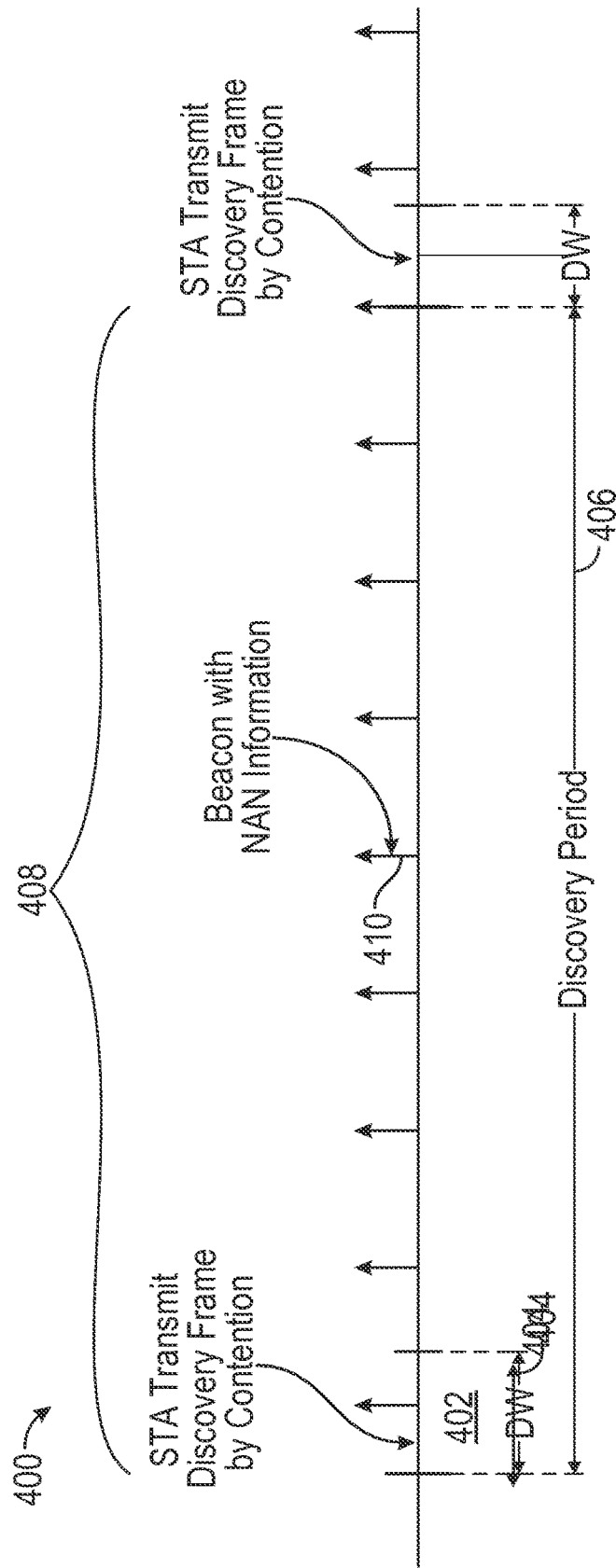
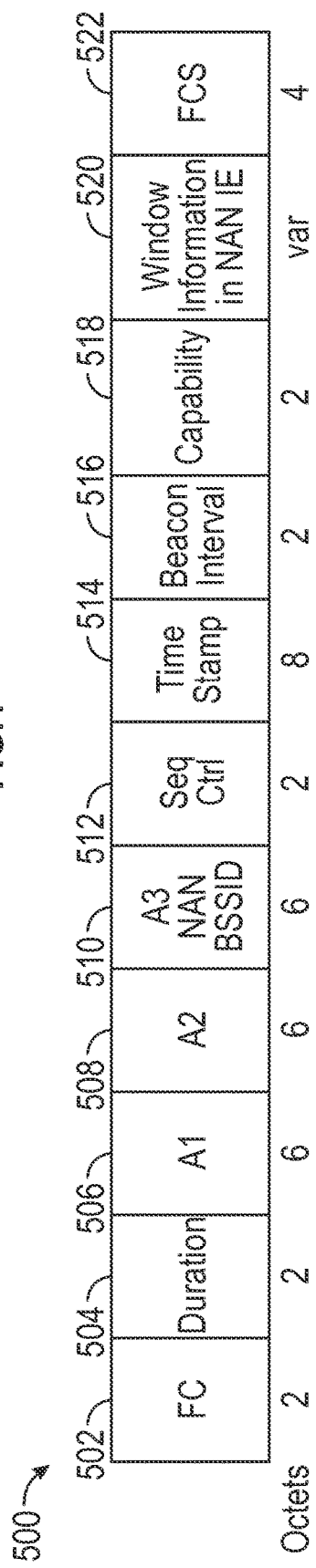
FIG. 4
FIG. 5A

SYSTEMS AND METHODS FOR SYNCHRONIZATION WITHIN A NEIGHBORHOOD AWARE NETWORK

PRIORITY CLAIM

This application claims priority under 35 U.S.C. § 119(e) to U.S. Provisional App. No. 62/076,033, filed Nov. 6, 2014, which is incorporated by reference herein in its entirety.

FIELD

The present application relates generally to wireless communications, and more specifically to systems, methods, and devices for synchronization in a peer-to-peer wireless network.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), a neighborhood aware network (NAN), or personal area network (PAN). Networks also differ according to the switching/routing technique used to interconnect the various network stations (STAs) and devices (e.g. circuit switching vs. packet switching), the type of physical media employed for transmission (e.g. wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Devices in a wireless network can transmit and/or receive information to and from each other. To carry out various communications, the devices can coordinate according to a protocol. As such, devices can exchange information to coordinate their activities. Improved systems, methods, and devices for coordinating transmitting and sending communications within a wireless network are desired.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include reduced power consumption when introducing devices on a medium.

One aspect of the disclosure provides a method of wireless communication. The method includes receiving, at an apparatus, at least one of: an offset parameter indicating an offset, with respect to a default time period, during which the apparatus should be in an active mode for transmitting and/or receiving data, and an interval parameter indicating a multiple of time periods, wherein the apparatus should be in the active mode for transmitting and/or receiving data during each time period. The method further includes determining at least one wakeup time period to be in the active mode based on the offset parameter or the interval parameter. The method further includes transmitting and/or receiving data during the at least one wakeup time period.

In various embodiments, wherein only the interval parameter is received, and the method can further include determining the offset parameter based on the interval parameter. In various embodiments, determining the offset parameter includes determining the offset parameter to be equal to: when the interval parameter is 2, when the interval parameter is 4, when the interval parameter is 8, and when the interval parameter is not a factor or multiple of 16, remainder((remainder(service identifier/interval parameter)+(interval parameter*ceiling(floor(time synchronization function value/524288)/interval parameter)))/16).

In various embodiments, the method can further include determining the default time period starting at each of at least one time synchronization function having 23 least-significant-bits equal to zero. In various embodiments, the method can further include transmitting a discovery frame during at least one time period other than the at least one wakeup time period. In various embodiments, the wakeup time period includes one of a plurality of 16 µs discovery windows occurring 16384 µs every 524288 µs.

In various embodiments, said transmitting and/or receiving data includes transmitting and/or receiving discovery frames in a neighborhood aware network. In various embodiments, the offset parameter or interval parameter is received via an application programming interface (API). In various embodiments, the interval parameter can be computed as min(1, floor(time interval in µs/524288 µs)). In various embodiments, the offset can be zero.

Another aspect provides an apparatus configured to wirelessly communicate. The apparatus includes a processor configured to receive at least one of an offset parameter indicating an offset, with respect to a default time period, during which the apparatus should be in an active mode for transmitting and/or receiving data, and an interval parameter indicating a multiple of time periods, wherein the apparatus should be in the active mode for transmitting and/or receiving data during each time period. The processor is further configured to determine at least one wakeup time period to be in the active mode based on the offset parameter or the interval parameter. The apparatus further includes a transmitter or receiver configured to transmit or receive data during the at least one wakeup time period.

In various embodiments, wherein only the interval parameter is received, and the processor can be further configured to determine the offset parameter based on the interval parameter. In various embodiments, the processor can be further configured to determine the offset parameter to be equal to: when the interval parameter is 2, when the interval parameter is 4, when the interval parameter is 8, when the interval parameter is not a factor or multiple of 16, remainder((remainder(service identifier/interval parameter)+(interval parameter*ceiling(floor(time synchronization function value/524288)/interval parameter)))/16).

In various embodiments, the processor can be further configured to determine the default time period starting at each of at least one time synchronization function having 23 least-significant-bits equal to zero. In various embodiments, the transmitter is further configured to transmit a discovery frame during at least one time period other than the at least one wakeup time period. In various embodiments, the wakeup time period includes one of a plurality of 16 μs discovery windows occurring 16384 μs every 524288 μs.

In various embodiments, said transmitting and/or receiving data includes transmitting and/or receiving discovery frames in a neighborhood aware network. In various embodiments, the offset parameter or interval parameter is received via an application programming interface (API). In various embodiments, the interval parameter can be computed as min(1, floor(time interval in μs/524288 μs)). In various embodiments, the offset can be zero.

Another aspect provides another apparatus for wireless communication. The apparatus includes means for receiving at least one of an offset parameter indicating an offset, with respect to a default time period, during which the apparatus should be in an active mode for transmitting and/or receiving data, and an interval parameter indicating a multiple of time periods, wherein the apparatus should be in the active mode for transmitting and/or receiving data during each time period. The apparatus further includes means for determining at least one wakeup time period to be in the active mode based on the offset parameter or the interval parameter. The apparatus further includes means for transmitting and/or receiving data during the at least one wakeup time period.

In various embodiments, wherein only the interval parameter is received, and the apparatus can further include means for determining the offset parameter based on the interval parameter. In various embodiments, means for determining the offset parameter includes means for determining the offset parameter to be equal to: when the interval parameter is 2, when the interval parameter is 4, when the interval parameter is 8, and when the interval parameter is not a factor or multiple of 16, remainder((remainder(service identifier/interval parameter)+(interval parameter*ceiling(floor(time synchronization function value/524288)/interval parameter)))/16).

In various embodiments, the apparatus can further include means for determining the default time period starting at each of at least one time synchronization function having 23 least-significant-bits equal to zero. In various embodiments, the apparatus can further include means for transmitting a discovery frame during at least one time period other than the at least one wakeup time period. In various embodiments, the wakeup time period includes one of a plurality of 16 μs discovery windows occurring 16384 μs every 524288 μs.

In various embodiments, said means for transmitting and/or receiving data includes means for transmitting and/or receiving discovery frames in a neighborhood aware network. In various embodiments, the offset parameter or interval parameter is received via an application programming interface (API). In various embodiments, the interval parameter can be computed as min(1, floor(time interval in μs/524288 μs)). In various embodiments, the offset can be zero.

Another aspect provides a non-transitory computer-readable medium. The medium includes code that, when executed, causes an apparatus to receive at least one of an offset parameter indicating an offset, with respect to a default time period, during which the apparatus should be in an active mode for transmitting and/or receiving data, and an interval parameter indicating a multiple of time periods, wherein the apparatus should be in the active mode for transmitting and/or receiving data during each time period. The medium further includes code that, when executed, causes the apparatus to determine at least one wakeup time period to be in the active mode based on the offset parameter or the interval parameter. The medium further includes code that, when executed, causes the apparatus to transmit or receive data during the at least one wakeup time period.

In various embodiments, wherein only the interval parameter is received, and the medium can further include code that, when executed, causes the apparatus to determine the offset parameter based on the interval parameter. In various embodiments, determining the offset parameter includes determining the offset parameter to be equal to: when the interval parameter is 2, when the interval parameter is 4, when the interval parameter is 8, and when the interval parameter is not a factor or multiple of 16, remainder((remainder(service identifier/interval parameter)+(interval parameter*ceiling(floor(time synchronization function value/524288)/interval parameter)))/16).

In various embodiments, the medium can further include code that, when executed, causes the apparatus to determine the default time period starting at each of at least one time synchronization function having 23 least-significant-bits equal to zero. In various embodiments, the medium can further include code that, when executed, causes the apparatus to transmit a discovery frame during at least one time period other than the at least one wakeup time period. In various embodiments, the wakeup time period includes one of a plurality of 16 μs discovery windows occurring 16384 μs every 524288 μs.

In various embodiments, said transmitting and/or receiving data includes transmitting and/or receiving discovery frames in a neighborhood aware network. In various embodiments, the offset parameter or interval parameter is received via an application programming interface (API). In various embodiments, the interval parameter can be computed as min(1, floor(time interval in μs/524288 μs)). In various embodiments, the offset can be zero.

BRIEF DESCRIPTION OF THE DRAWINGS

FIG. 4 illustrates an exemplary discovery window structure for an STA to communicate with an AP to discover a NAN in accordance with an exemplary implementation of the invention.

FIG. 5A shows an exemplary structure of a media access control (MAC) frame.

DETAILED DESCRIPTION

Figure 1A:
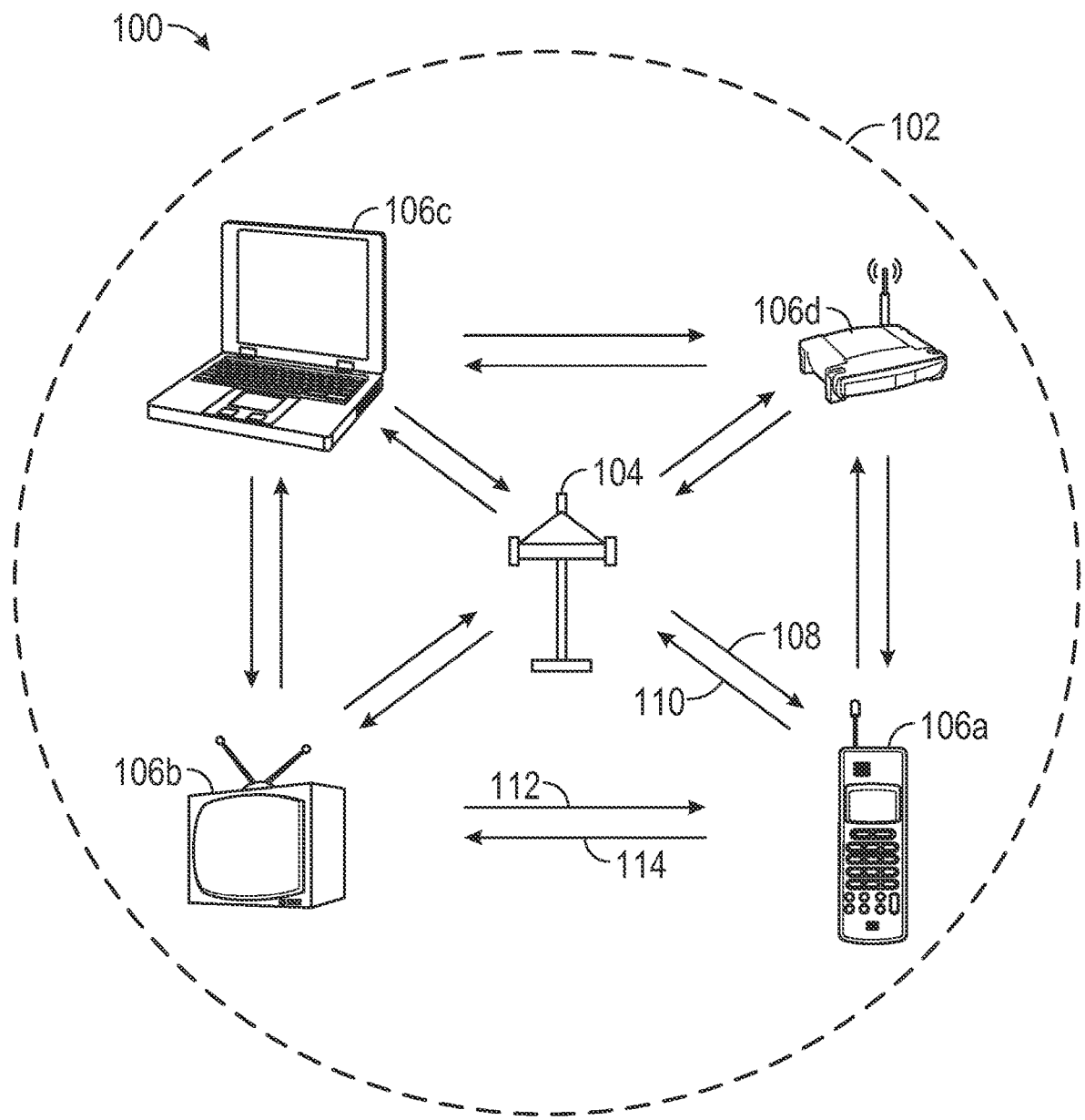
FIG. 1A illustrates an example of a wireless communication system.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies can include various types of wireless local area networks (WLANs). A WLAN can be used to interconnect nearby devices together, employing widely used networking protocols. However, the various aspects described herein can apply to any communication standard, such as a wireless protocol.

In some implementations, a WLAN includes various devices which are the components that access the wireless network. For example, there can be two types of devices: access points ("APs") and clients (also referred to as stations, or "STAs"). In general, an AP can serve as a hub or base station for the WLAN and a STA serves as a user of the WLAN. For example, a STA can be a laptop computer, a personal digital assistant (PDA), a mobile phone, etc. In an example, a STA connects to an AP via a Wi-Fi (e.g., Institute of Electrical and Electronics Engineers (IEEE) 802.11 protocol) compliant wireless link to obtain general connectivity to the Internet or to other wide area networks. In some implementations a STA can also be used as an AP.

An access point ("AP") can also include, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" can also include, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal can include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, one or more STAs of a peer-to-peer network can transmit synchronization messages to coordinate one or more availability windows for communication between STAs of the peer-to-peer network. The STAs can also exchange discovery queries and responses to provide for service discovery between devices operating within the same peer-to-peer or neighborhood aware network. A neighborhood aware network can be considered a peer-to-peer network or an ad-hoc network in some aspects. The STAs repeatedly wake from a sleep state to periodically transmit and/or receive synchronization messages and discovery messages. It would be advantageous if the STAs 106 were able to stay longer in a sleep state to conserve power and not wake from the sleep state to transmit and/or receive synchronization messages on the network. In addition, the transmission and retransmissions of synchronization and discovery messages by the STAs 106 can introduce a large amount of unnecessary overhead to the network In some embodiments, only a subset of STAs can be configured to transmit synchronization messages, for example, in order to reduce network congestion. In some embodiments, a subset of STAs can be designated or elected "master" STAs. For example, STAs that have access to an external power source can be elected as master STAs, whereas STAs that run on battery power may not. In various embodiments, STAs can be designated as one or more different types of master STAs including: discovery master STAs, synchronization master STAs, and/or anchor master STAs.

In some embodiments, one or more discovery master STAs can transmit NAN discovery messages, while other STAs may not. For example, discovery master STAs can be configured to transmit beacons outside of a discovery window. In some embodiments, one or more synchronization master STAs can transmit synchronization messages, while other STAs may not. For example, synchronization master STAs can be configured to transmit beacons within the discovery window.

In some embodiments, one or more anchor master STAs can be preferentially elected as synchronization master STAs and/or discovery master STAs. Anchor STAs can be preset, elected as described herein with respect to master STA election, or determined in another manner. NANs having an anchor STA can be referred to as anchored NANs and NANs having no anchor STA can be referred to as non-anchored NANs.

In some embodiments, one or more STAs in a NAN can elect one or more master STAs based on a dynamically determined or preset master preference value (MPV). For example, STAs with access to an external power source can set their MPV higher (e.g., 10), whereas STAs on battery power can set their MPV lower (e.g., 5). During the election process, STAs having a higher MPV can be more likely to be elected master STAs. In some embodiments, anchor STAs can have a higher MPV than non-anchor STAs, and thus can be more likely to be elected as master STAs.

In some cases, a master STA election process can cause unfairness amongst the STAs. For example, master STAs can consume more power and/or processor resources than non-master STAs. In certain implementations, master STAs can become "locked in" as master STAs, with little or no opportunity to pass on the responsibility of transmitting synchronization messages to other STAs. Moreover, one or more STAs in the NAN may not support the master STA election process. In some embodiments, STAs that do not support the master STA election process can set their MPV to a predetermined or minimum value. Accordingly, it can be beneficial for some STAs to adopt an inclusive, MPV-compatible, synchronization transmission process.

FIG. 1A illustrates an example of a wireless communication system 100. The wireless communication system 100 can operate pursuant to a wireless standard, such as an 802.11 standard. The wireless communication system 100 can include an AP 104, which communicates with STAs. In some aspects, the wireless communication system 100 can include more than one AP. Additionally, the STAs can communicate with other STAs. As an example, a first STA 106a can communicate with a second STA 106b. As another example, a first STA 106a can communicate with a third STA 106c although this communication link is not illustrated in FIG. 1A.

A variety of processes and methods can be used for transmissions in the wireless communication system 100 between the AP 104 and the STAs and between an individual STA, such as the first STA 106a, and another individual STA, such as the second STA 106b. For example, signals can be sent and received in accordance with OFDM/OFDMA techniques. If this is the case, the wireless communication system 100 can be referred to as an OFDM/OFDMA system. Alternatively, signals can be sent and received between the AP 104 and the STAs and between an individual STA, such as the first STA 106a, and another individual STA, such as the second STA 106b, in accordance with code division multiple access (CDMA) techniques. If this is the case, the wireless communication system 100 can be referred to as a CDMA system.

A communication link can be established between STAs. Some possible communication links between STAs are illustrated in FIG. 1A. As an example, a communication link 112 can facilitate transmission from the first STA 106a to the second STA 106b. Another communication link 114 can facilitate transmission from the second STA 106b to the first STA 106a.

The AP 104 can act as a base station and provide wireless communication coverage in a basic service area (BSA) 102. The AP 104 along with the STAs associated with the AP 104 and that use the AP 104 for communication can be referred to as a basic service set (BSS).

It should be noted that the wireless communication system 100 may not have a central AP 104, but rather can function as a peer-to-peer network between the STAs. Accordingly, the functions of the AP 104 described herein can alternatively be performed by one or more of the STAs.

Figure 1B:
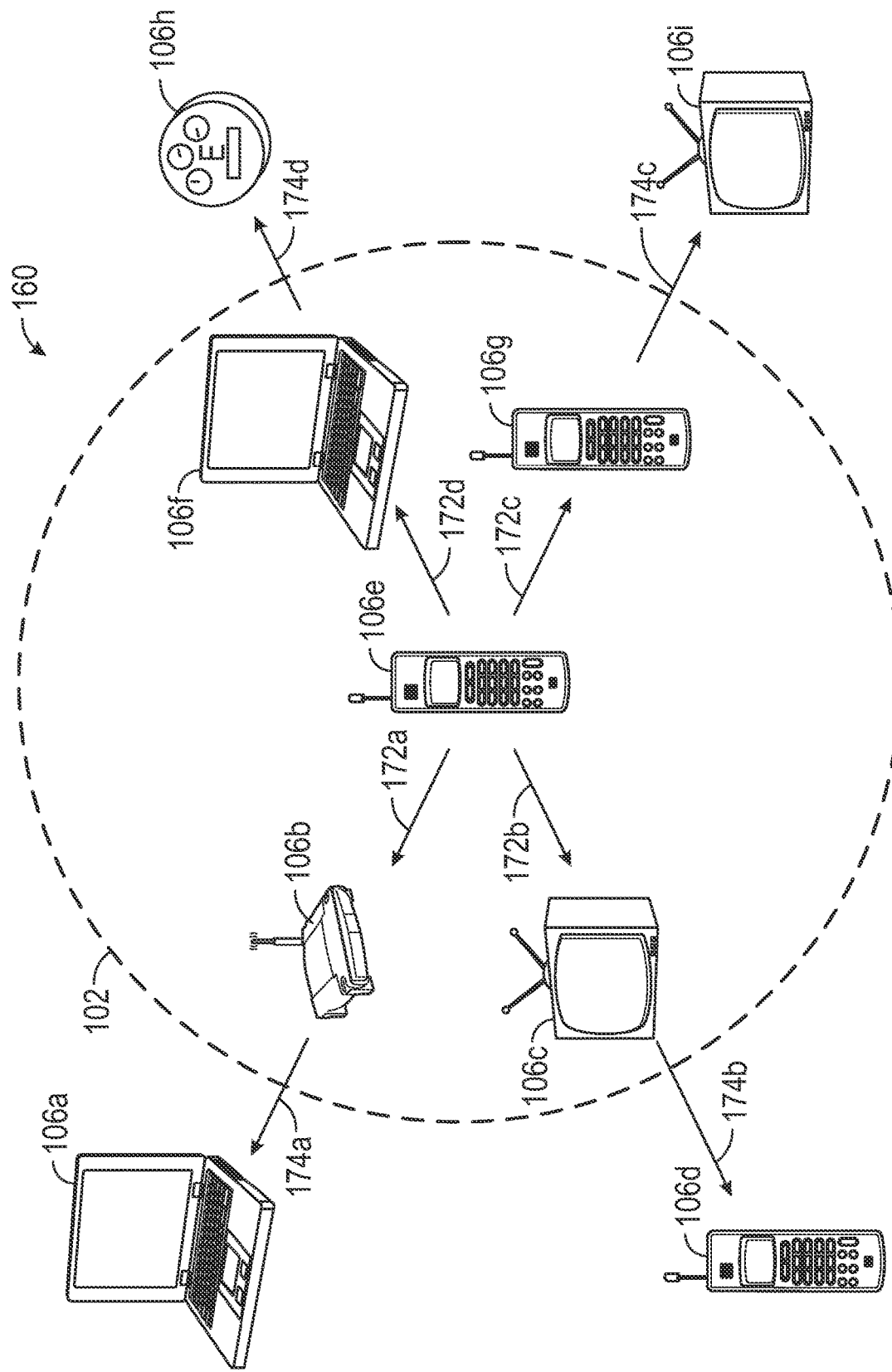
FIG. 1B illustrates another example of a wireless communication system.

FIG. 1B illustrates an example of a wireless communication system 160 that can function as a peer-to-peer network. For example, the wireless communication system 160 in FIG. 1B shows STAs 106a-106i that can communicate with each other without the presence of an AP. As such, the STAs, 106a-106i can be configured to communicate in different ways to coordinate transmission and reception of messages to prevent interference and accomplish various tasks. In one aspect, the networks shown in FIG. 1B can be configured as a "neighborhood aware networking" (NAN). In one aspect, a NAN can refer to a network for communication between STAs that are located in close proximity to each other. In some cases the STAs operating within the NAN can belong to different network structures (e.g., STAs in different homes or buildings as part of independent LANs with different external network connections).

In some aspects, a communication protocol used for communication between STAs on the peer-to-peer communications network 160 can schedule periods of time during which communication between network STAs can occur. These periods of time when communication occurs between STAs 106a-106i can be known as availability windows. An availability window can include a discovery interval or paging interval as discussed further below.

The protocol can also define other periods of time when no communication between STAs of the network is to occur. In some embodiments, STAs can enter one or more sleep states when the peer-to-peer network 160 is not in an availability window. Alternatively, in some embodiments, portions of the stations 106a-106i can enter a sleep state when the peer-to-peer network is not in an availability window. For example, some stations can include networking hardware that enters a sleep state when the peer-to-peer network is not in an availability window, while other hardware included in the STA, for example, a processor, an electronic display, or the like do not enter a sleep state when the peer-to-peer network is not in an availability window.

The peer-to-peer communication network 160 can assign one STAs to be a root STA, or can assign one or more STAs to be master STAs. In FIG. 1B, the assigned root STA is shown as STA 106e. In peer-to-peer network 160, the root STA is responsible for periodically transmitting synchronization signals to other STAs in the peer-to-peer network. The synchronization signals transmitted by root STA 160e can provide a timing reference for other STAs 106a-d and 106f-i to coordinate an availability window during which communication occurs between the STAs. For example, a synchronization message 172a-172d can be transmitted by root STA 106e and received by STAs 106b-106c and 106f-106g. The synchronization message 172 can provide a timing source for the STAs 106b-c and 106f-106g. The synchronization message 172 can also provide updates to a schedule for future availability windows. The synchronization messages 172 can also function to notify STAs 106b-106c and 106f-106g that they are still present in the peer-to-peer network 160.

Some of the STAs in the peer-to-peer communication network 160 can function as branch synchronization STAs. A branch synchronization STA can retransmit both availability window schedule and master clock information received from a root STA. In some embodiments, synchronization messages transmitted by a root STA can include availability window schedule and master clock information. In these embodiments, the synchronization messages can be retransmitted by the branch synchronization STAs. In FIG. 1B, STAs 106b-106c and 106f-106g are shown functioning as branch-synchronization STAs in the peer-to-peer communication network 160. STAs 106b-106c and 106f-106g receive the synchronization message 172a-172d from root STA 106e and retransmit the synchronization message as retransmitted synchronization messages 174a-174d. By retransmitting the synchronization message 172 from root STA 106e, the branch synchronization STAs 106b-106c and 106f-106g can extend the range and improve the robustness of the peer-to-peer network 160.

The retransmitted synchronization messages 174a-174d are received by STAs 106a, 106d, 106h, and 106i. These STAs can be characterized as "leaf" STAs, in that they do not retransmit the synchronization message they receive from either the root STA 106e or the branch synchronization STAs 106b-106c or 106f-106g. In some embodiments, a plurality of STAs can negotiate transmission of synchronization signals as discussed in greater detail herein.

Synchronization messages, or synchronization frames, can be transmitted periodically. However, periodic transmission of synchronization messages can be problematic for the STAs 106. These problems can be caused by the STAs 106 having to repeatedly wake from a sleep state to periodically transmit and/or receive synchronization messages. It would be advantageous if the STAs 106 were able to stay longer in a sleep state to conserve power and not wake from the sleep state to transmit and/or receive synchronization messages on the network.

When a new wireless device enters a location with a NAN, the wireless device can scan the airwaves for discovery and synchronization information before joining the NAN. It would be advantageous if the information necessary for the STA to join the NAN was quickly accessible to the STA.

In addition, the transmission and retransmissions of synchronization and/or discovery messages by the STAs 106 within a NAN can introduce a large amount of unnecessary overhead to the network.

Figure 2:
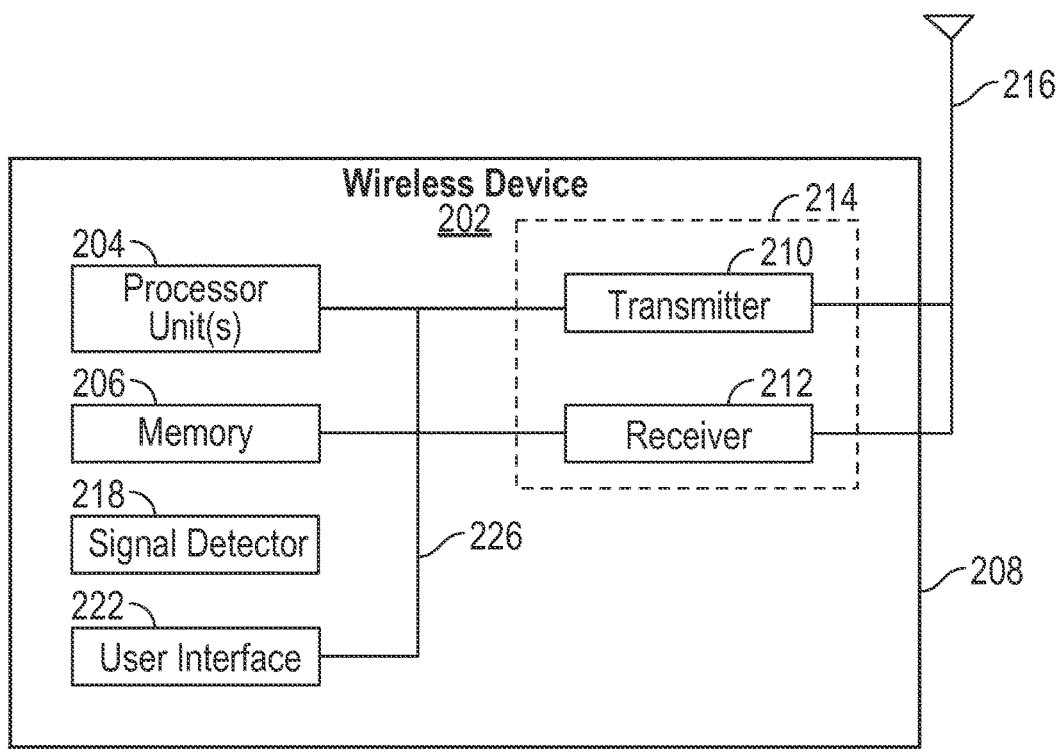
FIG. 2 illustrates a functional block diagram of a wireless device that can be employed within the wireless communication system of FIG. 1.

FIG. 2 illustrates various components that can be utilized in a wireless device 202 that can be employed within the wireless communication system 100 or 160. The wireless device 202 is an example of a device that can be configured to implement the various methods described herein. For example, the wireless device 202 can include the AP 104 or one of the STAs.

The wireless device 202 can include a processor 204 which controls operation of the wireless device 202. The processor 204 can also be referred to as a central processing unit (CPU). Memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can include or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and/or a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas.

The transmitter 210 can be configured to wirelessly transmit packets having different packet types or functions. For example, the transmitter 210 can be configured to transmit packets of different types generated by the processor 204. When the wireless device 202 is implemented or used as an AP 104 or STA 106, the processor 204 can be configured to process packets of a plurality of different packet types. For example, the processor 204 can be configured to determine the type of packet and to process the packet and/or fields of the packet accordingly. When the wireless device 202 is implemented or used as an AP 104, the processor 204 can also be configured to select and generate one of a plurality of packet types. For example, the processor 204 can be configured to generate a discovery packet including a discovery message and to determine what type of packet information to use in a particular instance.

The receiver 212 can be configured to wirelessly receive packets having different packet types. In some aspects, the receiver 212 can be configured to detect a type of a packet used and to process the packet accordingly.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a packet for transmission. In some aspects, the packet can include a physical layer data unit (PPDU).

The wireless device 202 can further include a user interface 222 in some aspects. The user interface 222 can include a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. The components of the wireless device 202 can be coupled together or accept or provide inputs to each other using some other mechanism.

Although a number of separate components are illustrated in FIG. 2, one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

Devices, such as STAs, 106a-106i shown in FIG. 1B, for example, can be used for neighborhood-aware networking, or NANing. For example, various stations within the network can communicate on a device to device (e.g., peer-to-peer communications) basis with one another regarding applications that each of the stations supports. A discovery protocol can be used in a NAN to enable STAs to advertise themselves (e.g., by sending discovery packets) as well as discover services provided by other STAs (e.g., by sending paging or query packets), while ensuring secure communication and low power consumption.

In a neighborhood-aware or NAN, one device, such as STA or wireless device 202, in the network can be designated as the root device or STA. In some embodiments, the root device can be an ordinary device, like the other devices in the network, rather than a specialized device such as a router. In NAN, the root STA can be responsible for periodically transmitting synchronization messages, or synchronization signals or frames, to other STAs in the network. The synchronization messages transmitted by root STA can provide a timing reference for other STAs to coordinate an availability window during which communication occurs between the STAs. The synchronization message can also provide updates to a schedule for future availability windows. The synchronization messages can also function to notify STAs that they are still present in the peer-to-peer network.

In a Neighborhood aware Network (NAN), STAs on the network can use synchronization messages transmitted by a root STA and retransmitted by branch STAs in order to determine availability windows. During these availability windows, STAs in the NAN can be configured to transmit and/or receive messages from other STAs on the network. At other times, STAs, or portions of STAs, on the NAN can be in a sleep state. For example, an STA on a NAN, such as wireless device 202, can enter a sleep state based at least in part on synchronization messages received from a root STA. In some embodiments, STAs on a NAN can enter a sleep mode, where one or more elements of the STA can enter a sleep mode, rather than the entire STA. For example, STA 202 can enter a sleep mode where the transmitter 210, receiver 212, and/or transceiver 214 can enter a sleep mode based on synchronization messages received on a NAN. This sleep mode can enable the STA 202 to conserve power or battery life.

Figure 3:
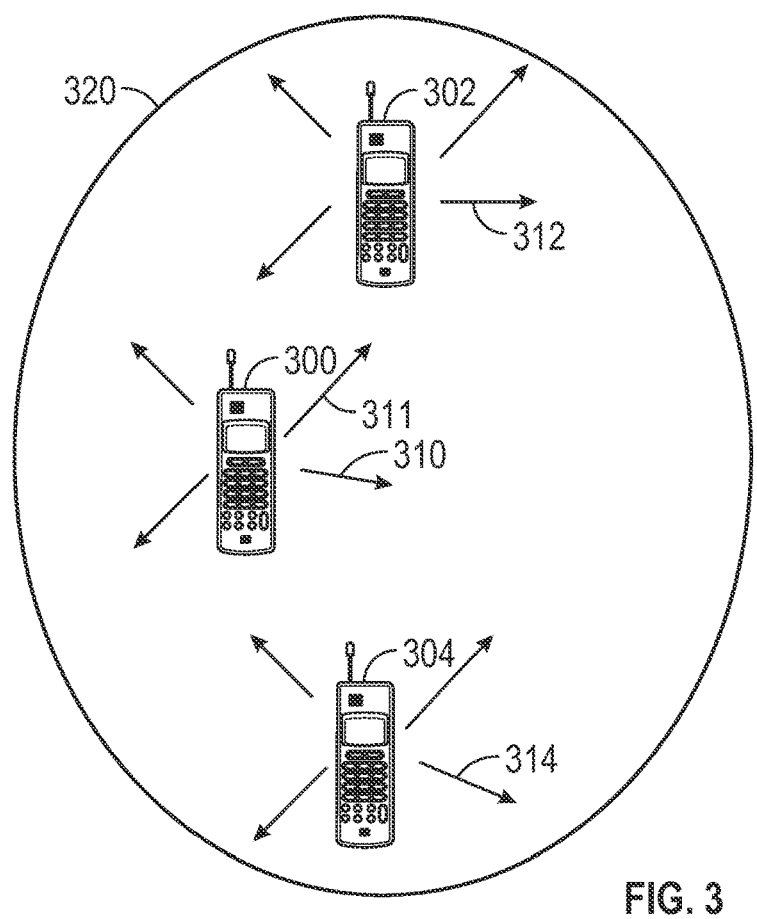
FIG. 3 illustrates an example of a communication system in which aspects of the present disclosure can be employed.

FIG. 3 illustrates an example of a NAN 320 in which aspects of the present disclosure can be employed. A master STA 300 of the network provides synchronization information to the STAs. In this way, the master STA 300 is configured to transmit and receive messages 310, 311, 312, and 314 with the STAs on the NAN 320. In various embodiments, the messages 310, 311, 312, and 314 can include any of the synchronization messages or data structures discussed herein.

STAs 300, 302, and 304 can be STAs on the NAN 320. In various embodiments, the STAs 300, 302, and 304 can correspond to any of the STAs 106a-106i (FIGS. 1A-1B), or any other STA discussed herein. As STAs on the NAN 320, STAs 300, 302, and 304 can receive and/or propagate synchronization information (for example via messages 310, 311, 312, and 314) to other STAs on the NAN 320. Accordingly, in various embodiments, master STAs can act as STAs and vice versa. These messages can be transmitted to other STAs during an availability window, during which time each STA is configured to transmit and/or receive transmissions from other STAs on the NAN 320. For example, STA 302 can transmit messages 312 to STA 304 during an availability window for both STAs, where the availability windows is based in part upon a synchronization message received from a root STA.

Because STAs on the NAN 320 are wireless and can have a finite amount of power between charges, it is advantageous if the STAs do not repeatedly wake from a sleep state to periodically transmit and/or receive synchronization messages between the STAs of the NAN 320. Thus, it would be advantageous if the STAs 300, 302, and 304 were able to stay longer in a sleep state to conserve power and not wake from the sleep state to transmit and/or receive synchronization messages on the network.

Master STA 300 can periodically transmit synchronization messages within the NAN 320. In some embodiments, synchronization messages can indicate the frequency of availability windows for STAs in the NAN 320, and can further indicate the frequency of synchronization messages and/or the interval until the next synchronization message. In this way, master STA 300 provides synchronization and some discovery functionality to the NAN 320. Since the master STA 300 may not go to sleep, or can sleep less often than other STAs, the master STA is able to coordinate discovery and timing for the NAN 320 independent of the state of the STAs 302, and 304. In this way, the STAs 302, and 304 rely on the master STA 300 for this functionality and can stay longer in the sleep state to save power.

Systems and methods in accordance with various embodiments provide for private service identifiers (IDs) for utilization in wireless devices (such as but not limited to STAs and APs) in NAN networks. A service ID may contain a hash of an input string (e.g., a service name) and may be carried in a service discovery frame (SDF). In a NAN, a service provider may publish the fact that it is providing a service using a publish function. For example, the publish function may be written as: publish(service_name, matching_filter_tx, matching_filter_rx, service_specific_info, configuration_parameters). Similarly, a device searching for a service may attempt to subscribe to the service using a subscribe function. For example, the subscribe function may be written as: subscribe(service_name, matching_filter_rx, matching_filter_tx, service_specific_info, configuration_parameters). A private service ID may comprise a service ID with additional privacy configuration parameters such that the service ID becomes encrypted. In certain embodiments, a private service ID may be generated as a hash value based on a service name and additional privacy configuration parameters.

In certain embodiments, wireless devices can provide services that other wireless devices can utilize. These services can be provided by software applications configured to execute on one wireless device while using information generated on another wireless device or information generated for another wireless device, such as but not limited to a game or social networking service. These services can be identified among wireless devices using a service ID within packetized communications among wireless devices. The size of a service ID can be variable, such as but not limited to six bytes.

As discussed above, a service ID encryption key and/or timing information can be utilized in generating the hash value to increase the privacy of the service IDs. A service ID generated as a hash value of a service name without privacy configuration parameters may allow third parties to determine which services are being used in an area and the frequency or length of use for a service. Third party monitoring of service use may be undesirable as a service provider or service user may not want their service use monitored. In certain embodiments, the likelihood of undesired third party monitoring of a service may decrease by generating a private service ID as a hash value of a service name, the hash value based on a service ID encryption key and/or timing information.

In certain embodiments, the hash value may be generated through the utilization of a hash function. A hash function is an algorithm that maps an input string of variable length to a hash value of a fixed length. In some embodiments, the input string may comprise a service name. Various types of hash functions may be utilized in certain embodiments disclosed herein (e.g., MD5, Secure Hash Algorithm (SHA), cyclic redundancy check (CRC), etc.). In some embodiments, computational limitations may limit the number of times a hash function may be used. For example, if a hash function requires a large of amount of computational power and/or time (e.g., SHA-256), using the hash function every discovery window may become impractical. To overcome some of these limitations, it may be beneficial to use more than one hash function or steps to generate the service ID.

In some embodiments, the discovery engine may use a combination of a high computation (HC) hash and/or a low computation (LC) hash. The LC hash requires lower computational power and/or less time than the HC hash. For example, the discovery engine or processor may compute a first service ID using a HC hash (e.g., SHA-256) as follows: service ID-1=Truncate to 6 bytes of (SHA-256 (service_name). The discovery engine or processor may then compute a second service ID (and/or each subsequent service ID) using an LC hash (e.g., CRC-64, SHA-3, tiny encryption algorithm (TEA)) based at least in part on the first service ID as follows: service ID-2=Truncate to 6 bytes of (LCHash (f (service ID-1, service ID encryption key, timing information). In some embodiments, the function f may comprise a concatenation of the service ID name, encryption key, and/or timing information. In other embodiments, the function f may comprise a bitwise exclusive OR (XOR), or other bitwise operation, of the timing information (e.g., timestamp), service ID, and/or encryption key.

FIG. 4 illustrates an exemplary discovery window structure for an STA to discover the NAN 320 in accordance with an exemplary implementation of the invention. The exemplary discovery window structure 400 can include a discovery window (DW) 402 of time duration 404 and an overall discovery period (DP) 406 interval of time duration 408. In some aspects, communications can occur via other channels as well. Time increases horizontally across the page over the time axis.

During the DW 402, STAs can advertise services through broadcast messages such as discovery packets or discovery frames. STAs can listen to broadcast messages transmitted by other STAs. In some aspects, the duration of DWs can vary over time. In other aspects, the duration of the DW can remain fixed over a period of time. The end of the DW 402 can be separated from the beginning of the subsequent DW by a first remainder period of time as illustrated in FIG. 4.

The overall interval of duration 408 can measure the period of time from the beginning of one DW to the beginning of a subsequent DW as illustrated in FIG. 4. In some embodiments, the duration 408 can be referred to as a discovery period (DP). In some aspects, the duration of the overall interval can vary over time. In other aspects, the duration of the overall interval can remain constant over a period of time. At the conclusion of the overall interval of duration 408, another overall interval can begin, including a DW and the remainder interval. Consecutive overall intervals can follow indefinitely or continue for a fixed period of time. A STA can enter a sleep or power-save mode when the STA is not transmitting or listening or is not expecting to transmit or listen.

Discovery queries are transmitted during the DW 402. STA responses to the transmitted discovery queries are transmitted during the DP 406. As explained below, the allocated time for transmitting responses to the transmitted probe or discovery queries can, for example, overlap with the allocated time for transmitting the discovery queries, be adjacent to the allocated time for transmitting the discovery queries, or be at some time period after the end of the allocated time for transmitting the discovery queries.

The STA which sent the request for a NAN 320 subsequently wakes up to receive a beacon. The STA in the sleep mode or power-save mode can awake or return to normal operation or full power mode at the beginning of the beacon 410 to enable listening by the STA. In some aspects, the STA can awake or return to normal operation or full power mode at other times when the STA expects to communicate with another device, or as a result of receiving a notification packet instructing the STA to awake. The STA can awake early to ensure that the STA receives the beacon 410. The beacon includes an information element, described below, which at least identifies the NAN 320 which is responsive to the probe request of the STA.

The start and end of the DW 402 can be known via numerous methods to each STA desiring to transmit a probe or discovery query. In some aspects, each STA can wait for a beacon. The beacon can specify the start and end of the DW 402.

FIG. 5A shows an exemplary structure of a media access control (MAC) frame 500. In some aspects, MAC frame 500 can be utilized for the beacon signal 410 discussed above. As shown, the MAC frame 500 includes 11 different fields frame control (FC) field 502 a duration/identification (dur) field 504, a receiver address (A1) field 506, a transmitter address (A2) field 508, a destination address (A3) field 510, which in some aspects can indicate a NAN BSS identifier (BSSID), a sequence control (sc) field 512, a timestamp field 514, a beacon interval field 516, a capability field 518, an information element 520 including window information, and a frame check sequence (FCS) field 522. The fields 502-522 include a MAC header in some aspects. Each field can include one or more sub-fields or fields. For example, frame control field 502 of media access control header 500 can include multiple subfields, such as a protocol version, type field, subtype field, and other fields. Moreover, a person having ordinary skill in the art will appreciate that the various fields described herein can be rearranged, resized, some fields can be omitted, and additional fields can be added.

In some aspects, the NAN BSSID field 510 can indicate a cluster of NAN devices. In another embodiment, each NAN can have a different (for example, pseudorandom) NAN BSSID 510. In an embodiment, the NAN BSSID 510 can be based on a service application. For example, a NAN created by Application A can have a BSSID 510 based on an identifier of Application A. In some embodiments, the NAN BSSID 510 can be defined by a standards-body. In some embodiments, the NAN BSSID 510 can be based on other contextual information and/or device characteristics such as, for example, a device location, a server-assigned ID, etc. In one example, the NAN BSSID 510 can include a hash of the latitude and longitude location of the NAN. The NAN BSSID field 510 shown is six octets long. In some implementations, NAN BSSID field 510 can be four, five, or eight octets long. In some embodiments, the AP 104 can indicate the NAN BSSID field 510 in an information element.

In various embodiments, the frame 500, or another discovery frame, can include the MPV. In an embodiment, the FC field 502 can include the master preference value discussed above with respect to FIGS. 1A-1B. In an embodiment, the A2 field 508 can include the MPV. In various examples, the entire A2 field 508 can include the MPV, one or more most-significant-bits (MSBs) or least-significant-bits (LSBs) can be replaced with the MPV, etc. In an embodiment, the NAN-BSSID field 510 can include the MPV. In various examples, the entire NAN-BSSID field 510 can include the MPV, one or more most-significant-bits (MSBs) or least-significant-bits (LSBs) can be replaced with the MPV, etc. In an embodiment, the capability field 518 can include the MPV. In an embodiment, one or more information elements (IEs) 520 can include the MPV, for example as an attribute. In one example, the IE 600, described below with respect to FIG. 6A, can include the MPV, although other IEs can include the MPV. In various embodiments described herein, fields that include the MPV can alternatively include an indication or representation of the MPV rather than the MPV itself.

Figure 5B:
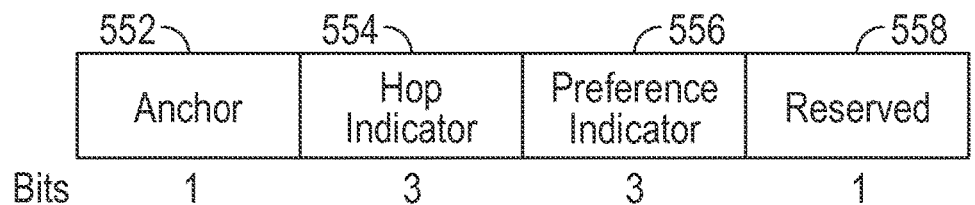
FIG. 5B shows an exemplary structure of a master preference value (MPV).

FIG. 5B shows an exemplary structure of a master preference value (MPV) 550. In some aspects, the MPV 550 can be utilized for election of a master STA and/or processing of NAN messages, for example as described in herein with respect to FIGS. 5B-5C. As shown, the MPV 550 includes an anchor flag 552, a hop indicator 554, a preference indicator 556 and a reserved bit 558. A person having ordinary skill in the art will appreciate that the various fields described herein can be rearranged, resized, some fields can be omitted, and additional fields can be added.

The anchor flag 552 serves to indicate whether the STA 106a transmitting the MPV is an anchor STA. Although various embodiments herein are discussed with respect to the STA 106a of FIG. 1A, any STA can implement the features discussed, including STAs 106a-106i of FIGS. 1A-1B and STAs 300, 302, and 304 of FIG. 3. As shown, the anchor flag 552 is one bit long. In various other embodiments, the anchor flag 552 can be another length such as, for example, two or three bits long. In some embodiments, the anchor flag 552 can be variable length.

In an embodiment, the STA 106 can set the anchor flag 552 to 0b1 when the STA 106 is an anchor STA. The STA 106 can set the anchor flag 552 to 0b0 when the STA 106 is not an anchor STA. Thus, the STA 106 can set the anchor flag 552 to 0b0 in embodiments where the STA 106 is in a non-anchored NAN. Accordingly, anchor STAs can have a higher MPV 550 than non-anchor STAs. Thus, in some embodiments, anchor STAs can be given preference in master STA election and/or NAN message processing.

The hop indicator 554 serves to indicate a hop distance of the transmitting STA 106 to the nearest anchor STA. For example, in anchored NANs, a STA that receives one or more messages from an anchor STA (i.e., a STA that can "hear" an anchor STA) can set the hop indicator 554 to 0b111. In an embodiment, a STA that does not receive any messages from an anchor STA (i.e., a STA that cannot "hear" an anchor STA) can set the hop indicator 554 to the highest hop indicator 554 received from any STA, minus one. For example, a STA that has received a highest hop indicator 554 of 0b111 from another STA can set its hop indicator 554 to 0b110, a STA that has received a highest hop indicator 554 of 0b110 from another STA can set its hop indicator 554 to 0x101, and so on.

In various other embodiments the hop indicator 554 can be incremented rather than decremented as hop distance increases. In some embodiments, anchor STAs can set the hop indicator 554 to all ones or 0x111. In some embodiments, a STA that receives one or more messages from an anchor STA (i.e., a STA that can "hear" an anchor STA) can set the hop indicator 554 to the hop indicator 554 of the anchor STA, minus one. For example, where an anchor STA sets a hop indicator 554 to 0x111, a non-anchor STA that can hear the anchor STA can set its hop indicator 554 to 0x110. In some embodiments, STAs 106 in a non-anchored NAN can set the hop indicator 554 to zero or 0b000. As shown, the hop indicator 554 is three bits long. In various other embodiments, the hop indicator 554 can be another length such as, for example, two or four bits long. In some embodiments, the hop indicator 554 can be variable length.

The preference indicator 556 serves to indicate a preference of the STA 106 for becoming a master STA. As shown, the preference indicator 556 is three bits long. In various other embodiments, the preference indicator 556 can be another length such as, for example, two or four bits long. In some embodiments, the preference indicator 556 can be variable length. The STA 106 can set the preference indicator 556 based on one or more device characteristics, capabilities, and/or features.

In various embodiments, the STA 106 can increase and/or decrease the preference indicator 556, subject to a maximum and minimum value, based on one or more of: a radio frequency (RF) characteristic (e.g., link speed, signal strength, etc.), a power source, a power consumption rate, a remaining battery power, a clock type, a clock accuracy, a processor load, a user interaction, a preset value, etc. For example, the STA 106 can increment the preference indicator 556 when the STA 106 is plugged into mains power source or when it has synchronized its clock signal via global positioning system (GPS). As another example, the STA 106 can decrement the preference indicator 556 and/or refrain from incrementing the preference indicator 556 when the STA 106 has a high processor load and/or has an RF link with an error rate above a threshold.

Figure 5C:
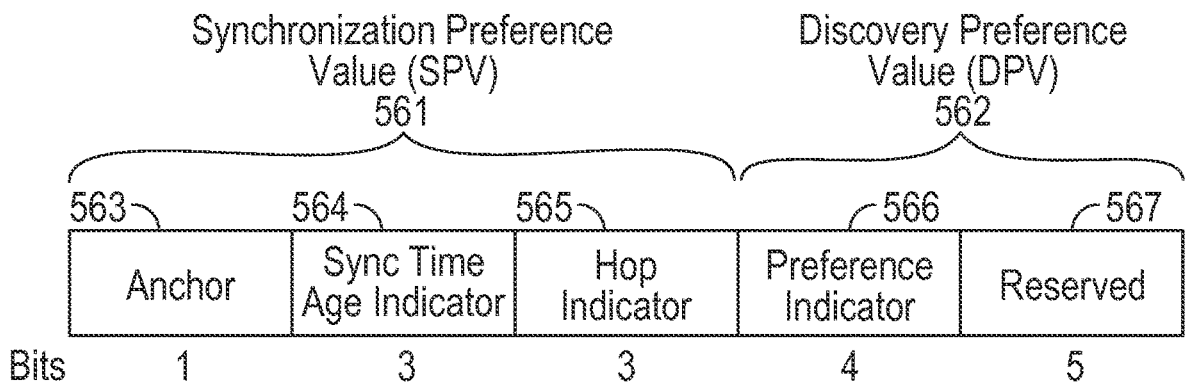
FIG. 5C shows another exe44mplary structure of a master preference value (MPV).

FIG. 5C shows an exemplary structure of a master preference value (MPV) 560. In some aspects, the MPV 560 can be utilized for election of a master STA and/or processing of NAN messages, for example as described in herein with respect to FIGS. 5B-5C. As shown, the MPV 560 includes a synchronization preference value (SPV) 561 and a discovery preference value (DPV) 562. A person having ordinary skill in the art will appreciate that the various fields described herein can be rearranged, resized, some fields can be omitted, and additional fields can be added.

The synchronization preference value 561 indicates a preference or suitability for a transmitting STA to become a master STA. As shown, the synchronization preference value 561 includes an anchor flag 563, a synchronization time age indicator (STAI) 564, and a hop indicator 565. As shown, the synchronization preference value 561 is seven bits long. In various other embodiments, the synchronization preference value 561 can be another length such as, for example, four or eleven bits long. In some embodiments, the synchronization preference value 561 can be variable length. A person having ordinary skill in the art will appreciate that the various fields described herein can be rearranged, resized, some fields can be omitted, and additional fields can be added.

The anchor flag 563 serves to indicate whether the STA 106 transmitting the MPV is an anchor STA. As shown, the anchor flag 563 is one bit long. In various other embodiments, the anchor flag 563 can be another length such as, for example, two or three bits long. In some embodiments, the anchor flag 563 can be variable length.

In an embodiment, the STA 106 can set the anchor flag 563 to 0b1 when the STA 106 is an anchor STA. The STA 106 can set the anchor flag 563 to 0b0 when the STA 106 is not an anchor STA. Thus, the STA 106 can set the anchor flag 563 to 0b0 in embodiments where the STA 106 is in a non-anchored NAN. Accordingly, anchor STAs can have a higher MPV 560 than non-anchor STAs. Thus, in some embodiments, anchor STAs can be given preference in master STA election and/or NAN message processing.

The synchronization time age indicator 564 serves to indicate a measure of how much time has passed since the transmitting STA last synched its clock to an anchor STA clock. As shown, the synchronization time age indicator 564 is three bits long. In various other embodiments, the synchronization time age indicator 564 can be another length such as, for example, two or four bits long. In some embodiments, synchronization time age indicator 564 can be variable length.

In an embodiment, the STA 106 can set the synchronization time age indicator 564 to 0b111 when the STA 106 is an anchor STA. When the STA 106 is not an anchor STA, the STA 106 can receive a beacon (including a synchronization time age indicator) from another STA (referred to herein as the "synchronization STA"), and can synchronize its clock based on the beacon. The STA 106 can set the synchronization time age indicator 564 to the synchronization time age indicator in the beacon received from the synchronization STA, minus a number of discovery windows that have elapsed since the beacon was received.

For example, a STA 106 that receives a beacon from an anchor STA in a current discovery window can set its synchronization time age indicator 564 to 0b111−0b0=0b111. In the next discovery window, the STA 106 can set its synchronization time age indicator 564 to 0b111−0b1=0b110, and so on. Accordingly, non-anchor STAs 106 that have recently synchronized their clocks with an anchor STA can have a relatively higher MPV 560. Thus, in some embodiments, STAs 106 with relatively up-to-date clocks can be given preference in master STA election and/or NAN message processing. In embodiments where the STA 106 is in a non-anchored NAN, the STA 106 can set the synchronization time age indicator 564 to zero or 0b000.

The hop indicator 565 serves to indicate a hop distance of the transmitting STA 106 to the nearest anchor STA. For example, in anchored NANs, a STA that receives one or more messages from an anchor STA (i.e., a STA that can "hear" an anchor STA) can set the hop indicator 565 to 0b111. In an embodiment, a STA that does not receive any messages from an anchor STA (i.e., a STA that cannot "hear" an anchor STA) can set the hop indicator 565 to the highest hop indicator 565 received from any STA, minus one. For example, a STA that has received a highest hop indicator 565 of 0b111 from another STA can set its hop indicator 565 to 0b110, a STA that has received a highest hop indicator 565 of 0b110 from another STA can set its hop indicator 565 to 0x101, and so on.

In various other embodiments the hop indicator 565 can be incremented rather than decremented as hop distance increases. In some embodiments, anchor STAs can set the hop indicator 565 to all ones or 0x111. In some embodiments, a STA that receives one or more messages from an anchor STA (i.e., a STA that can "hear" an anchor STA) can set the hop indicator 565 to the hop indicator 565 of the anchor STA, minus one. For example, where an anchor STA sets a hop indicator 565 to 0x111, a non-anchor STA that can hear the anchor STA can set its hop indicator 565 to 0x110. In some embodiments, STAs 106 in a non-anchored NAN can set the hop indicator 565 to zero or 0b000. As shown, the hop indicator 565 is three bits long. In various other embodiments, the hop indicator 565 can be another length such as, for example, two or four bits long. In some embodiments, the hop indicator 565 can be variable length.

The discovery preference value 562 indicates a preference or suitability for a transmitting STA to become a master STA. As shown, the discovery preference value 562 includes a preference indicator 566 and five reserved bits 567. As shown, the discovery preference value 562 is nine bits long. In various other embodiments, the discovery preference value 562 can be another length such as, for example, three or four bits long. In some embodiments, the discovery preference value 562 can be variable length. A person having ordinary skill in the art will appreciate that the various fields described herein can be rearranged, resized, some fields can be omitted, and additional fields can be added.

The preference indicator 566 serves to indicate a preference of the STA 106 for becoming a master STA. As shown, the preference indicator 566 is four bits long. In various other embodiments, the preference indicator 566 can be another length such as, for example, three or five bits long. In some embodiments, the preference indicator 566 can be variable length. The STA 106 can set the preference indicator 566 based on one or more device characteristics, capabilities, and/or features.

In various embodiments, the STA 106 can increase and/or decrease the preference indicator 566, subject to a maximum and minimum value, based on one or more of: an RF characteristic (e.g., link speed, signal strength, etc.), a power source, a power consumption rate, a remaining battery power, a clock type, a clock accuracy, a processor load, a user interaction, a preset value, etc. For example, the STA 106 can increment the preference indicator 566 when the STA 106 is plugged into mains power source or when it has synchronized its clock signal via global positioning system (GPS), or using a Wide Area Network timing source. As another example, the STA 106 can decrement the preference indicator 566 and/or refrain from incrementing the preference indicator 566 when the STA 106 has a high processor load and/or has an RF link with an error rate above a threshold.

Figure 6A:
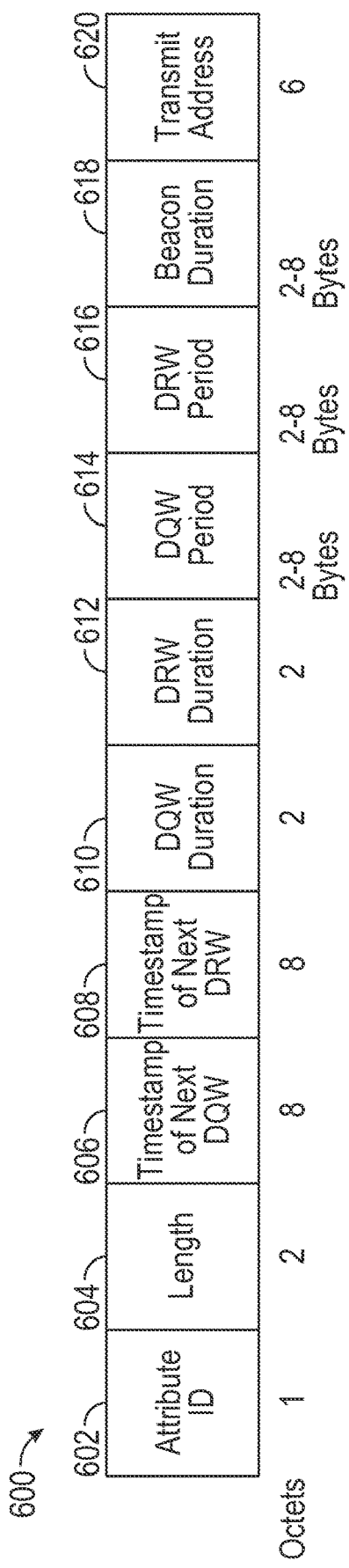
FIG. 6A shows an exemplary attribute of a NAN information element (IE) that can be employed within the NAN of FIG. 3.

FIG. 6A shows an exemplary attribute of a NAN information element (IE) 600 that can be employed within the NAN 320 of FIG. 3. In various embodiments, any device described herein, or another compatible device, can transmit the attribute of the NAN IE 600 such as, for example, the AP 104 (FIG. 1A) or any STA discussed herein such as STAs 106a-106i of FIGS. 1A-1B and STAs 300, 302, and 304 of FIG. 3. One or more messages in the wireless NAN 320 can include the attribute of the NAN IE 600 such as, for example, the beacon 410. In some aspects, the NAN information element 600 can be included in MAC header 500 field 520 as described above.

As shown in FIG. 6A, the attribute of the NAN IE 600 includes an attribute ID 602, a length field 604, a Timestamp of a next Discovery Query Window (DQW) field 606, a Timestamp of the next Discovery Response Window (DRW)

field 608, a Discovery Query Window (DQW) duration field 610, a Discovery Response Window (DRW) duration field 612, a DQW Period field 614, a DRW Period field 616, a Beacon Window field 618, and a transmit address field 620. A person having ordinary skill in the art will appreciate that the attribute of the NAN IE 600 can include additional fields, and fields can be rearranged, removed, and/or resized.

The attribute identifier field 602 shown is one octet long. In some implementations, the attribute identifier field 602 can be two, five, or twelve octets long. In some implementations, the attribute identifier field 602 can be of variable length, such as varying length from signal to signal and/or as between service providers. The attribute identifier field 602 can include a value which identifies the element as an attribute of the NAN IE 600.

The length field 604 can be used to indicate the length of the attribute of the NAN IE 600 or the total length of subsequent fields. The length field 604 shown in FIG. 6A is two octets long. In some implementations, the length field 604 can be one, five, or twelve octets long. In some implementations, the length field 604 can be of variable length, such as varying length from signal to signal and/or as between service providers.

The Timestamp of next DQW field 606 can indicate a start time of the next discovery query window (for example, the start of the next discovery period 406 described above with respect to FIG. 4). In various embodiments, the start time can be indicated using an absolute timestamp or a relative timestamp. The Timestamp of next DQW field 608 can indicate a start time of the next discovery query response. In various embodiments, the start time can be indicated using an absolute timestamp or a relative timestamp.

The DQW duration field 610 can indicate a duration of the DQW. In various embodiments, the DQW duration field 610 can indicate the duration of the DQW in ms, µs, time units (TUs), or another unit. In some embodiments, time units can be 1024 µs. The DQW duration field 610 shown is two octets long. In some implementations, DQW duration field 610 can be four, six, or eight octets long.

The DRW duration field 612 can indicate a duration of the DRW. In various embodiments, the DRW duration field 612 can indicate the duration of the DRW in ms, µs, time units (TUs), or another unit. In some embodiments, time units can be 1024 µs. The DRW duration field 612 shown is two octets long. In some implementations, DRW duration field 612 can be four, six, or eight octets long.

In some embodiments, the DQW period field 614 can indicate a length of the DQW. In various embodiments, the DQW period field 614 can indicate the length of the DQW in ms, µs, time units (TUs), or another unit. In some embodiments, time units can be 1024 µs. The DQW period field 614 shown is between two and eight octets long. In some implementations, the DQW period field 614 can be two, four, six, or eight octets long.

In some embodiments, the DRW period field 616 can indicate a length of the DRW. In various embodiments, the DRW period field 616 can indicate the length of the DRW in ms, µs, time units (TUs), or another unit. In some embodiments, time units can be 1024 µs. The DRW period field 616 shown is between two and eight octets long. In some implementations, the DRW period field 616 can be two, four, six, or eight octets long.

The Beacon Duration field 618 can indicate a duration of a Beacon Window. In various embodiments, the Beacon Duration field 618 can indicate the duration of the Beacon Window in ms, µs, time units (TUs), or another unit. In some embodiments, time units can be 1024 µs. The Beacon Window field 618 shown is between two and eight octets long. In some implementations, Beacon Window field 618 can be four, six, or eight octets long.

The Transmit Address field 620 indicates a network address of a STA transmitting the NAN IE 600. In some aspects, the A3 field 510 of the MAC header 500 discussed above with respect to FIG. 5A will instead be set to a NAN BSSID. Therefore, NAN IE 600 provides the transmitter address field 620 to enable receivers to determine the network address of the transmitter.

Figure 6B:
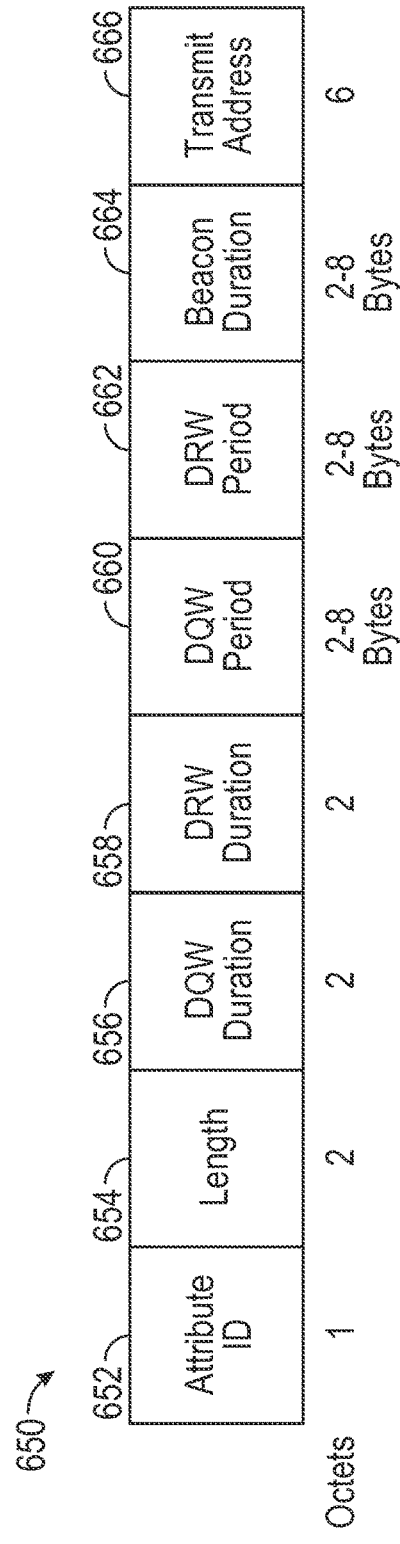
FIG. 6B shows another exemplary attribute of a NAN information element (IE) that can be employed within the NAN of FIG. 3.

FIG. 6B shows another exemplary attribute of a NAN information element (IE) 650 that can be employed within the NAN 320 of FIG. 3. In various embodiments, any device described herein, or another compatible device, can transmit the attribute of the NAN IE 650 such as, for example, the AP 104 (FIG. 1A) or any STA discussed herein, such as STAs 106a-106i of FIGS. 1A-1B and STAs 300, 302, and 304 of FIG. 3. One or more messages in the wireless NAN 320 can include the attribute of the NAN IE 650 such as, for example, the beacon 410. In some aspects, the NAN information element 650 can be included in MAC header 500 field 520 as described above.

NAN information element 650 differs from NAN information element 600 in that the discovery query window timestamp and the discovery query response window timestamp have been removed from NAN information element 650 relative to NAN information element 600. In some aspects, a receiver of NAN information element 650 can determine a discovery query window start time as the time when a local clock reference that is synchronized to a NAN clock reference is evenly divided by the DQW period field 660 (Station Clock mod DQW period=0). Similarly, the discovery response window start time can be determined in some aspects based on when a local clock synchronized to a NAN clock reference is evenly divided by the DRW period field 662 (Station Clock mod DRW period=0). Note that these example methods of determining a discovery query window or discovery response window start time are similar to the method used to determine a beacon window start time, which can be found in some aspects as Station Clock mod Beacon Interval=0).

Figure 7:
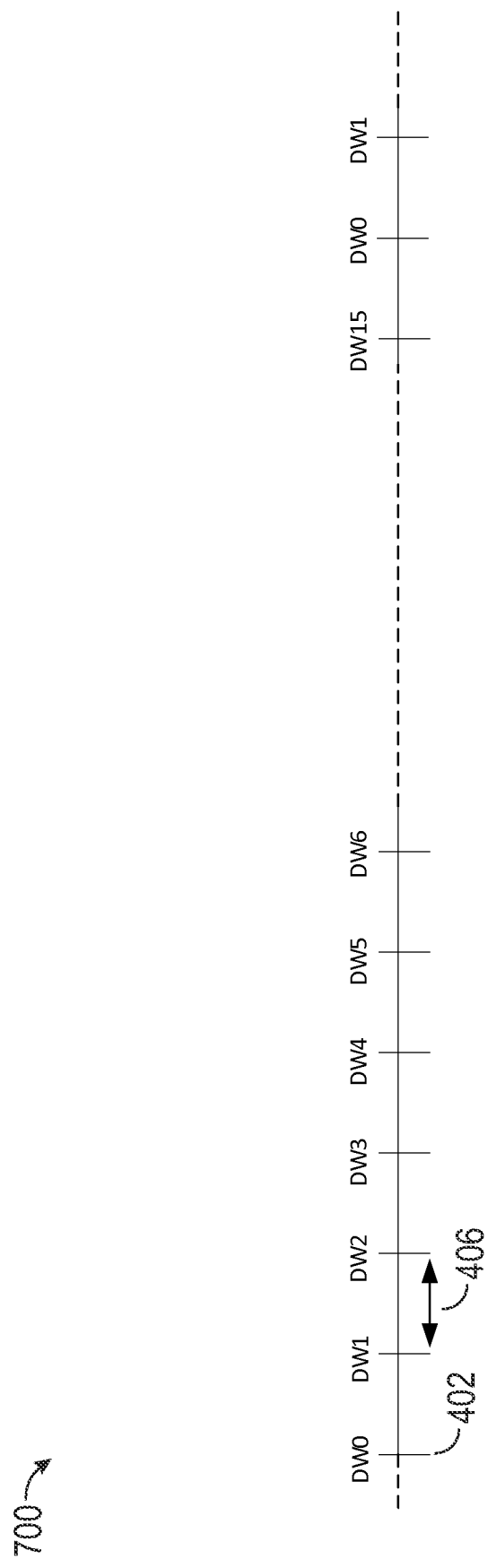
FIG. 7 is a timing diagram illustrating a plurality of discovery windows.

FIG. 7 is a timing diagram 700 illustrating a plurality of discovery windows 402. Shown on the timing diagram 700 are a plurality of discovery windows 402, labeled DW0-DW15, occurring every discovery period 406. In the illustrated embodiment, discovery windows 402 are 16 time units (TUs) in duration, with each TU being 1024 µs long. As shown, the discovery period 406 is 512 TUs long. Accordingly, in the illustrated embodiment discovery windows 402 occur every 512 TUs.

The sequence of DWs 402 are indexed from DW0-DW15, which repeat. In the illustrated embodiments, DW0 represents the DW having a start time when the last 23 bits of the time synchronization function (TSF) value are zero. In other words, each indexed DW0 occurs every 16*512*1024 µs, each indexed DW1 occurs every 16*512*1024 µs, and so on.

As discussed above, applications can interface with the discovery engine through publish and subscribe functions. In some embodiments, each STA 106 can adhere to one of two wakeup modes. In a first wakeup mode, the STA 106 can wake up to transmit and/or receive data at every DW 402. Waking up every DW 402 can allow the STA 106 more opportunities to transmit/receive data, but can increase power consumption In a second wakeup mode, the STA 106 can wake up to transmit and/or receive data every $16^{th}$ DW 402. For example, in some embodiments, STAs 106 can wake up at every DW0. Waking up every 16$^{th}$ DW 402 can reduce power consumption as compared to waking up every DW 402, but can increase latency. Moreover, both the first and second wakeup modes can increase contention for any given DW 402 (for example, many devices may wake up for DW0). Accordingly, systems and methods are desired to increase flexibility in DW wakeup modes.

In one embodiment, applications, or application programming interfaces (APIs) can specify an offset and/or frequency for STAs 106 to wake up. For example, the offset can be specified with respect to DW0. Accordingly, devices can wake up for DWs 402 associated with specific applications. Thus, applications with low latency tolerance can specify a higher wake-up frequency, and applications with higher latency tolerance can specify a lower wake-up frequency. Moreover, the offset can decrease the likelihood of high contention for any given DW 402

In some embodiments, the configuration parameters can include a DW offset parameter and/or a DW interval parameter. The DW offset parameter can specify an wakeup offset with respect to DW0. For example, an application can specify a DW offset of 1 to indicate that STAs 106 should wake up at DW1. Similarly, the DW interval parameter can specify an interval (for example, in DWs, TUs, or μs) at which STAs 106 should wake up. For example, an application can specify an interval of 16 DWs to indicate that STAs 106 should wake up every 16$^{th}$ DW 402.

In an embodiment, if the publish and/or subscribe function is called (with respect to an associated service) with DW offset and/or DW interval parameters, then the STA 106 will wake up to receive discovery frames for the associated service at the DWs 402 corresponding to specified offset and/or interval. Moreover, the STA 106 will send discovery frames for the associated service only at the DWs corresponding to the specified offset and/or interval. In some embodiments, transmission of discovery frames is still subject to DW contention rules. In some embodiments, the STA 106 can send discovery frames for the associated service at other, unspecified, DWs 402. As used herein, the specified offset and/or interval can include a specified offset and interval, a specified offset and default or dynamically determined interval, or a specified interval and default or dynamically determined offset.

In one embodiment, the offset that a STA 106 uses can be specified as a function of the service ID. In an embodiment, for DW intervals that are 2, 4, or 8 DWs, the last 1, 2, and 3 bits (respectively) of the service ID can be used as an offset. For example, if the DW interval is 2 DWs, and the last bit of the service ID is 0, then the STA 106 can wake up at every DW0, DW2, DW4, DW6, DW8, DW10, DW12, and DW14. As another example, if the DW interval is 4, and the last two bits of the service ID is 0b01 (i.e., 0d1), then the STA 106 can wake up at every DW1, DW5, DW8, and DW13, in addition to a default wakeup at DW0. As another example, if the DW interval is 8 DWs, and the last 3 bits of the service ID are 0b101 (i.e., 0d5), then the STA 106 can wake up at every DW5, and DW13, in addition to a default wakeup at DW0.

In an embodiment, for DW intervals that are not factors or multiples of 16, the STA 106 can determine a next wakeup DW as shown in Equations 1-4, where x1 represents the number of DWs that have elapsed:

$$\text{FixedOffset} = \text{remainder}(\text{ServiceID}/\text{DWinterval}) \quad (1)$$

$$x1 = \text{Floor}(\text{TSF}/(512*1024)) \quad (2)$$

$$\text{AbsoluteDWNext} = \text{DWInterval} * \text{ceil}(x1/\text{DWInterval}) \quad (3)$$

$$\text{DWnext} = \text{remainder}((\text{FixedOffset} + \text{AbsoluteDWNext})/16) \quad (4)$$

Figure 8:
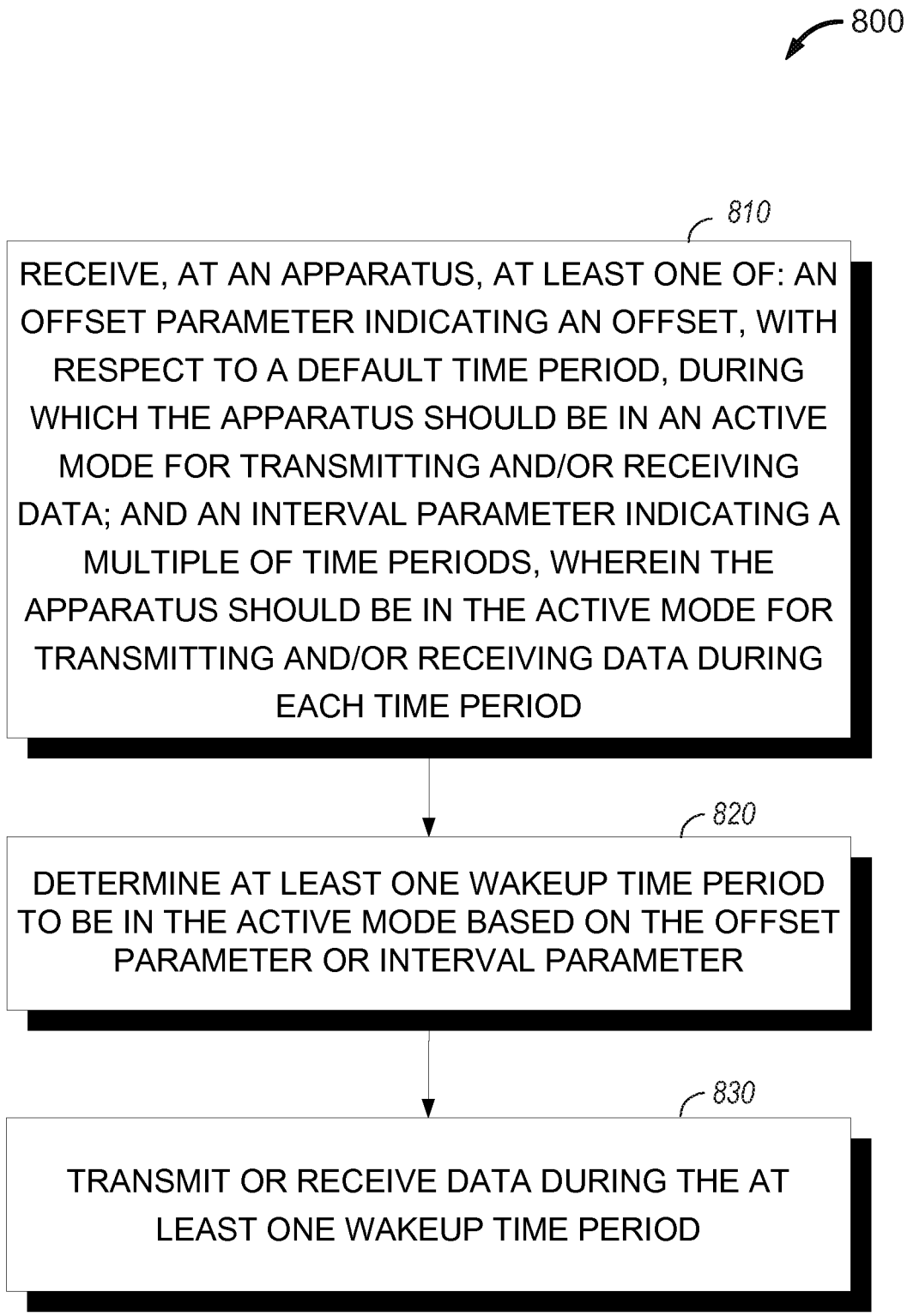
FIG. 8 shows a flowchart 800 of a method of transmitting and/or receiving a discovery frame in accordance with an embodiment.

FIG. 8 shows a flowchart 800 of a method of transmitting and/or receiving a discovery frame in accordance with an embodiment. The method can be implemented in whole or in part by the devices described herein, such as the wireless device 202 shown in FIG. 2, or any of the STAs 106a-106i shown in FIGS. 1A-1B, and 300. Although the illustrated method is described herein with reference to the wireless communication systems 100 and 160 discussed above with respect to FIGS. 1A-1B, and the wireless device 202 discussed above with respect to FIG. 2, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added. Moreover, although the method of flowchart 800 is described herein with respect to discovery frames, the method can be applied to any type of NAN frame including, for example, synchronization beacons and cluster discovery beacons.

First, at block 810, an apparatus receives at least one of an offset parameter and an interval parameter. The offset parameter indicates an offset, with respect to a default time period, during which the apparatus should be in an active mode for transmitting and/or receiving data. For example, the STA 106 can receive the DW offset parameter, discussed above with respect to FIG. 7, via a publish/subscribe function of an API. The interval parameter indicates a multiple of time periods, wherein the apparatus should be in the active mode for transmitting and/or receiving data during each time period. For example, the STA 106 can receive the DW interval parameter, discussed above with respect to FIG. 7, via a publish/subscribe function of an API.

In various embodiments, the interval parameter can be computed as min(1, floor(time interval in μs/524288 μs)). For example, the application can specify a time interval for a service (for example, via the API) in μs. The STA 106 can round the time interval down to the nearest multiple of a DW duration, in this example 524288 μs, with a minimum of 1 DW. In other embodiments, the STA 106 can round the time interval up, or the time interval can be rounded to a different multiple. In various embodiments, the offset can be zero.

Next, at block 820, the apparatus determines at least one wakeup time period to be in the active mode based on the offset parameter or interval parameter. For example, the STA 106 can determine one or more of the DWs 402 based on the DW offset parameter and/or the DW interval parameter as discussed above with respect to FIG. 7.

In various embodiments, only the interval parameter is received, and the method can further include determining the offset parameter based on the interval parameter. For example, as discussed above with respect to FIG. 7, the STA 106 can determine the DW offset parameter or next DW, based on Equations 1-4. In various embodiments, determining the offset parameter includes determining the offset parameter to be equal to: when the interval parameter is 2, when the interval parameter is 4, when the interval parameter is 8, and when the interval parameter is not a factor or multiple of 16, remainder((remainder(service identifier/interval parameter)+(interval parameter*ceiling(floor(time synchronization function value/524288)/interval parameter)))/16).

In various embodiments, the method can further include determining the default time period starting at each of at least one time synchronization function having 23 least-significant-bits equal to zero. For example, the STA 106 can be configured to additionally, or alternatively, wake up at every DW0.

Then, at block 830, the apparatus transmits or receives data during the at least one wakeup time period. For example, the STA 106 can wake up at the determined DW 402 (FIG. 7). As used herein, waking up can generally refer to being available to transmit and/or receive data (such as one or more discovery frames). The STA 106 can be monitor the wireless medium and otherwise be ready to receive a discovery frame during the determined DW 402. The STA 106 can transmit one or more discovery frames for the associated service (e.g., publish or subscribe) within the determined DW 402.

In some embodiments, the STA 106 can refrain from transmitting discovery frames outside the determined DW 402. In various embodiments, the method can further include transmitting a discovery frame during at least one time period other than the at least one wakeup time period. For example, the STA 106 can additionally or alternatively transmit one or more discovery frames at DWs 402 other than the determined DW.

In various embodiments, the wakeup time period includes one of a plurality of 16 TUs discovery windows occurring 16384 μs every 524288 μs. In various embodiments, said transmitting and/or receiving data includes transmitting and/or receiving discovery frames in a neighborhood aware network. In various embodiments, the offset parameter or interval parameter is received via an application programming interface (API).

In an embodiment, the method shown in FIG. 8 can be implemented in a wireless device that can include a receiving circuit, a determining circuit, and a transmitting and/or receiving circuit. Those skilled in the art will appreciate that a wireless device can have more components than the simplified wireless device described herein. The wireless device described herein includes only those components useful for describing some prominent features of implementations within the scope of the claims.

The receiving circuit can be configured to receive the offset or interval parameter. The receiving circuit can be configured to perform at least block 810 of FIG. 8. The receiving circuit can include one or more of the processor 204 (FIG. 2), the memory 206 (FIG. 2), the receiver 212 (FIG. 2), the antenna 216 (FIG. 2), and the transceiver 214 (FIG. 2). In some implementations, means for receiving can include the receiving circuit.

The determining circuit can be configured to determine the wakeup time period. The receiving circuit can be configured to perform at least block 820 of FIG. 8. The determining circuit can include one or more of the processor 204 (FIG. 2) and the memory 206 (FIG. 2). In some implementations, means for determining can include the determining circuit.

The transmitting and/or receiving circuit can be configured to transmit or receive data during the at least one wakeup time period. The transmitting and/or receiving circuit can be configured to perform at least block 830 of FIG. 8. The transmitting and/or receiving circuit can include one or more of the transmitter 210 (FIG. 2), the receiver 212 (FIG. 2), the antenna 216 (FIG. 2), and the transceiver 214 (FIG. 2). In some implementations, means for transmitting and/or receiving can include the transmitting and/or receiving circuit.

In the above discussion, certain events such as transitioning to an active mode or to a sleep mode, or sending frames of data are described as occurring at certain specifically defined times. Of course, exact timing is a practical impossibility, the events themselves may have their own durations from start to completion, and it may also be useful to further include buffer periods around the described times, such as awakening slightly before a determined time period and entering a sleep mode slightly after determined time period instead of exactly at these times. Thus, the event times described here are intended to be approximate in nature, in accordance with the desired goals of maintaining time synchronization, successfully exchanging messages during discovery windows, and reducing the amount of awake time for the members of the NAN to perform these processes.

It should be understood that any reference to an element herein using a designation such as "first," "second," and so forth does not generally limit the quantity or order of those elements. Rather, these designations can be used herein as a convenient wireless device of distinguishing between two or more elements or instances of an element. Thus, a reference to first and second elements does not mean that only two elements can be employed there or that the first element can precede the second element in some manner. Also, unless stated otherwise a set of elements can include one or more elements.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein can be implemented as electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-8 can be implemented within or performed by an integrated circuit (IC), an access terminal, or an access point. The IC can include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and can execute codes or instructions that reside within the IC, outside of the IC, or both. The logical blocks, modules, and circuits can include antennas and/or transceivers to communicate with various components within the network or within the device. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. The functionality of the modules can be implemented in some other manner as taught herein. The functionality described herein (e.g., with regard to one or more of the accompanying figures) can correspond in some aspects to similarly designated "means for" functionality in the appended claims.

If implemented in software, the functions can be stored on or transmitted over as one or more instructions or code on a computer-readable medium. The steps of a method or algorithm disclosed herein can be implemented in a processor-executable software module which can reside on a computer-readable medium. Computer-readable media includes both computer storage media and communication media including any medium that can be enabled to transfer a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm can reside as one or any combination or set of codes and instructions on a machine readable medium and computer-readable medium, which can be incorporated into a computer program product.

It is understood that any specific order or hierarchy of steps in any disclosed process is an example of a sample approach. Based upon design preferences, it is understood that the specific order or hierarchy of steps in the processes can be rearranged while remaining within the scope of the present disclosure. The accompanying method claims present elements of the various steps in a sample order, and are not meant to be limited to the specific order or hierarchy presented.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication, comprising:
   receiving, at an apparatus, an offset parameter indicating an offset, with respect to a default time period, during which the apparatus should be in an active mode for transmitting and/or receiving data related to a service advertised during the default time period;
   determining the default time period starting at one or more times when a time synchronization function has a value whose 23 least-significant-bits are equal to zero;
   determining at least one wakeup time period to be in the active mode based on the offset parameter, wherein the at least one wakeup time period comprises one of a plurality of discovery windows, the plurality of discovery windows comprising one of a plurality of 16 time unit (TU) discovery windows occurring every 524288 μs; and
   transmitting and/or receiving the data related to the advertised service during the at least one wakeup time period.

2. The method of claim 1, further comprising transmitting a discovery frame during at least one time period other than the at least one wakeup time period.

3. The method of claim 1, wherein the transmitting and/or receiving the data related to the advertised service comprises transmitting and/or receiving discovery frames in a neighborhood aware network (NAN).

4. The method of claim 1, wherein the offset parameter is received via an application programming interface (API).

5. The method of claim 1, wherein the offset is zero.

6. An apparatus configured to wirelessly communicate, comprising:
   a processor configured to:
   receive an offset parameter indicating an offset, with respect to a default time period, during which the apparatus should be in an active mode for transmitting and/or receiving data related to a service advertised during the default time period; and determine the default time period starting at one or more times when a time synchronization function has a value whose 23 least-significant-bits are equal to zero;

determine at least one wakeup time period to be in the active mode based on the offset parameter, wherein the at least one wakeup time period comprises one of a plurality of discovery windows, the plurality of discovery windows comprising one of a plurality of 16 time unit (TU) discovery windows occurring every 524288 µs; and a transmitter or receiver configured to transmit or receive the data related to the advertised service during the at least one wakeup time period.

7. The apparatus of claim 6, wherein the transmitter is further configured to transmit a discovery frame during at least one time period other than the at least one wakeup time period.

8. The apparatus of claim 6, wherein the transmitting and/or receiving the data related to the advertised service comprises transmitting and/or receiving discovery frames in a neighborhood aware network (NAN).

9. The apparatus of claim 6, wherein the offset parameter is received via an application programming interface (API).

10. The apparatus of claim 6, wherein the offset is zero.

11. An apparatus for wireless communication, comprising:

means for receiving an offset parameter indicating an offset, with respect to a default time period, during which the apparatus should be in an active mode for transmitting and/or receiving data related to a service advertised during the default time period;

means for determining the default time period starting at one or more times when a time synchronization function has a value whose 23 least-significant-bits are equal to zero;

means for determining at least one wakeup time period to be in the active mode based on the offset parameter, wherein the at least one wakeup time period comprises one of a plurality of discovery windows, the plurality of discovery windows comprising one of a plurality of 16 time unit (TU) discovery windows occurring every 524288 µs; and means for transmitting and/or receiving the data related to the advertised service during the at least one wakeup time period.

12. The apparatus of claim 11, further comprising means for transmitting a discovery frame during at least one time period other than the at least one wakeup time period.

13. The apparatus of claim 11, wherein said means for transmitting and/or receiving the data related to the advertised service comprises means for transmitting and/or receiving discovery frames in a neighborhood aware network (NAN).

14. The apparatus of claim 11, wherein the offset parameter is received via an application programming interface (API).

15. The apparatus of claim 11, wherein the offset is zero.

16. A non-transitory computer-readable medium comprising code that, when executed, causes an apparatus to:

receive an offset parameter indicating an offset, with respect to a default time period, during which the apparatus should be in an active mode for transmitting and/or receiving data related to a service advertised during the default time period;

determine the default time period starting at one or more times when a time synchronization function has a value whose 23 least-significant-bits are equal to zero;

determine at least one wakeup time period to be in the active mode based on the offset parameter, wherein the at least one wakeup time period comprises one of a plurality of discovery windows, the plurality of discovery windows comprising one of a plurality of 16 time unit (TU) discovery windows occurring every 524288 µs; and transmit or receive the data related to the advertised service during the at least one wakeup time period.

17. The non-transitory computer-readable medium of claim 16, further comprising code that, when executed, causes the apparatus to transmit a discovery frame during at least one time period other than the at least one wakeup time period.

18. The non-transitory computer-readable medium of claim 16, wherein the transmitting and/or receiving the data related to the advertised service comprises transmitting and/or receiving discovery frames in a neighborhood aware network (NAN).

19. The non-transitory computer-readable medium of claim 16, wherein the offset parameter is received via an application programming interface (API).

20. The non-transitory computer-readable medium of claim 16, wherein the offset is zero.

* * * * *